J. L. MORROW.
STRAP CLUTCH.
APPLICATION FILED DEC. 27, 1911.
1,038,628.
Patented Sept. 17, 1912.
2 SHEETS—SHEET 1.
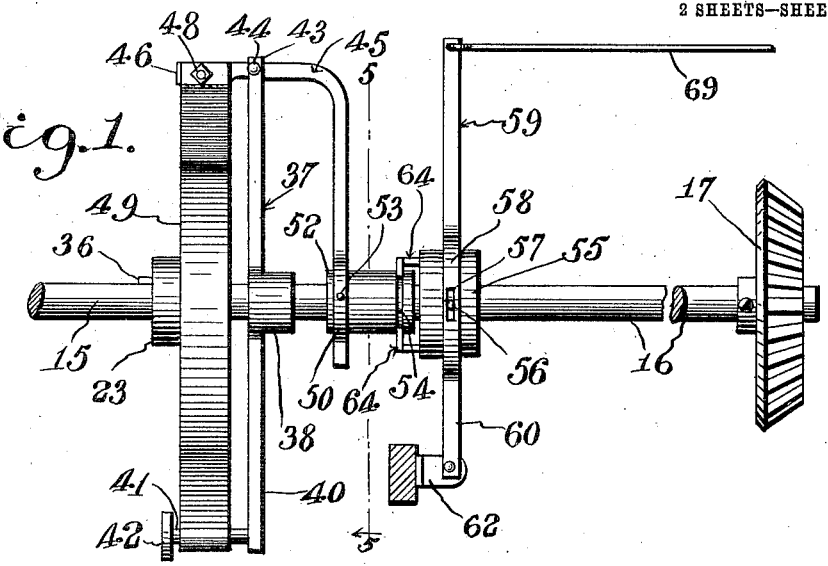
Fig. 1.
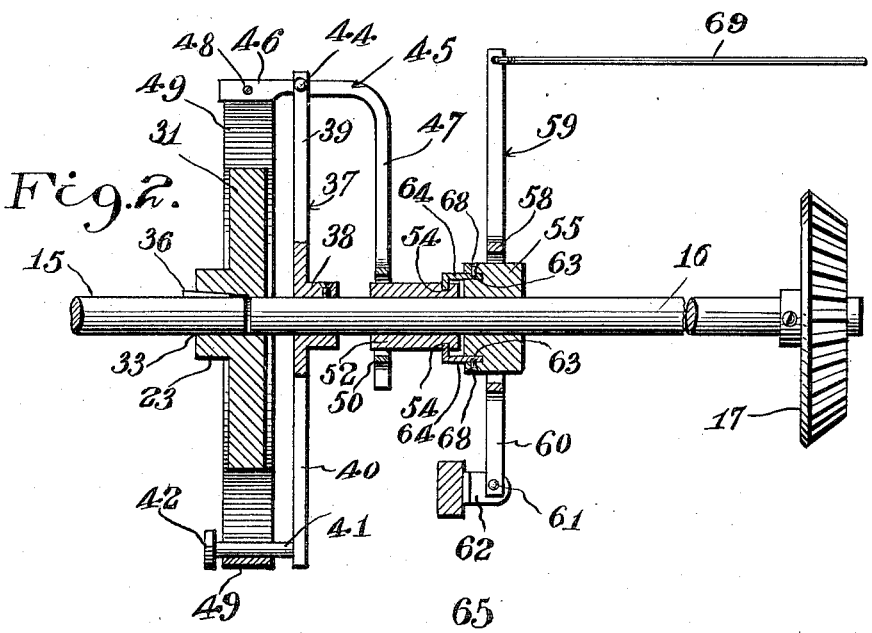
Fig. 2.
Fig. 7.
Witnesses
Inventor
J. L. Morrow.
By Harry Ellis Chandlee
Attorney J. L. MORROW.
STRAP CLUTCH.
APPLICATION FILED DEC. 27, 1911.
1,038,628.
Patented Sept. 17, 1912.
2 SHEETS—SHEET 2.
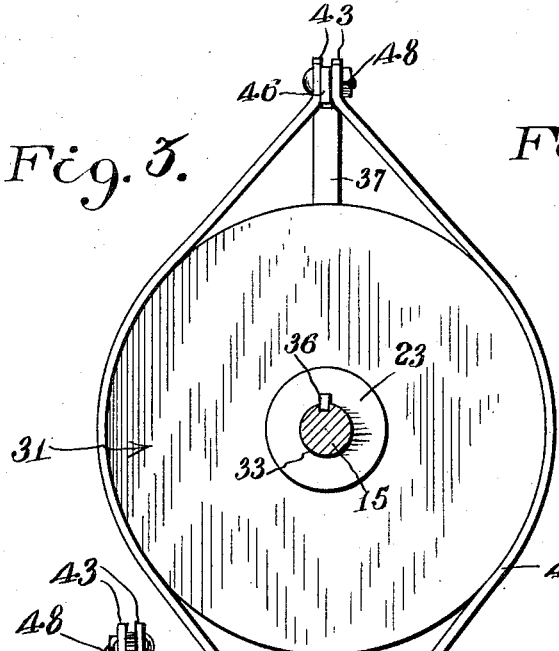
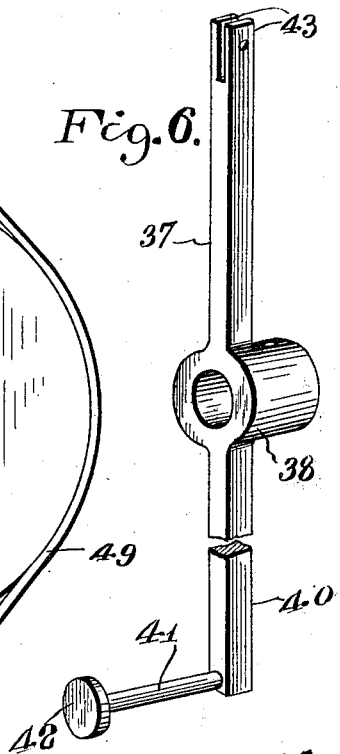
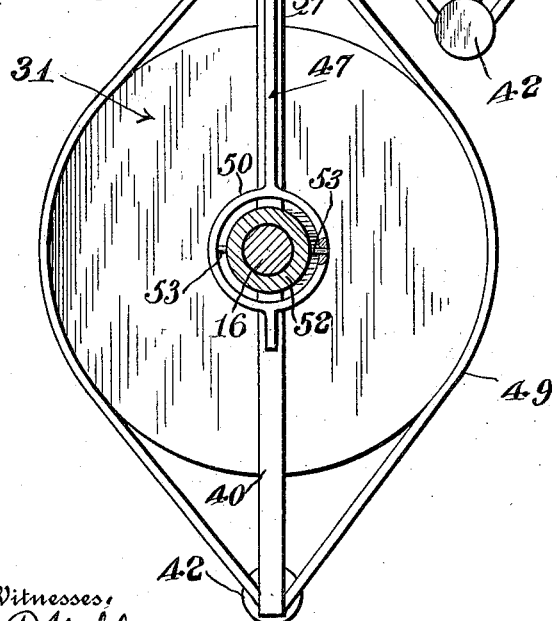
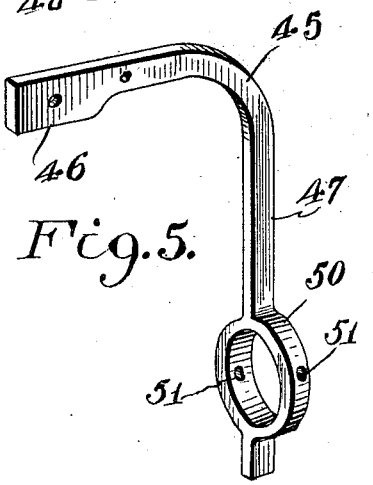
Witnesses:
Inventor
J. L. Morrow.
By Harry Eelis Chandler
Attorney

UNITED STATES PATENT OFFICE.

JAMES L. MORROW, OF ANTIOCH, TENNESSEE.

STRAP-CLUTCH.

1,038,628.　　　　Specification of Letters Patent.　　Patented Sept. 17, 1912.

Application filed December 27, 1911. Serial No. 668,113.

*To all whom it may concern:*

Be it known that I, JAMES L. MORROW, a citizen of the United States, residing at Antioch, in the county of Davidson and State of Tennessee, have invented certain new and useful Improvements in Strap-Clutches, of which the following is a specification.

This invention relates to improvements in friction clutches of that type which is employed for connecting a crank shaft to or disconnecting the same from a driven shaft.

Another object of the invention is to provide a friction clutch for the purpose described which can be readily controlled by the operator from his seat.

A further object of the invention is to provide a friction clutch of the character described which is composed of a minimum number of parts, is therefore simple in construction, is positive in operation, and is cheap to manufacture.

With these and other objects in view, the invention consists in the construction and novel combination of parts, hereinafter fully described, illustrated in the accompanying drawings, and pointed out in the claims hereto appended, it being understood that various changes in the form, proportion, size and minor details of construction within the scope of the claims, may be resorted to without departing from the spirit or sacrificing any of the advantages of the invention.

In the drawings: Figure 1 is a side elevation of a clutch mechanism constructed in accordance with my invention, Fig. 2 is a longitudinal sectional view through such a clutch, parts thereof being shown in elevation, Fig. 3 is a front elevation of the clutch, the crank shaft being shown in cross section, Fig. 4 is a detail sectional view taken on the line 5—5 of Fig. 1, Fig. 5 is a perspective view of the clutch lever, Fig. 6 is a perspective view of the clutch lever bracket, Fig. 7 is a perspective view of one of the shipper pins.

Like reference numerals designate corresponding parts in all the figures of the drawings.

My invention comprises a clutch mechanism for coupling a crank shaft 15 to or uncoupling the same from a driven shaft 16. This clutch mechanism includes a drum 31 which is formed with a hub 32 and a concentric bore 33 adapted to receive the meeting ends of the crank shaft 15 and the driven shaft 16. It will thus be observed that the drum forms a support for the forward end of said driven shaft, the rear end thereof being supported in a suitable bearing 34 secured upon a cross-brace 35 which is connected at its ends to the sills 5 of the main frame. This pulley is fixedly secured to the crank shaft 15 by means of a key 36 or any other suitable means.

A bracket 37 is centrally formed with a hub 38, and this hub is mounted upon the forward end of the driven shaft 16, and is fixedly secured thereto by any suitable means. This bracket includes an upwardly extending arm 39 and a downwardly extending arm 40, said arms respectively projecting beyond the periphery of the drum 31. Secured to the lower end of the arm 40 of said bracket is a forwardly extending pin 41. This pin is disposed below the drum 31 in spaced relation thereto and is formed with a head 42. The upper end of the arm 39 is slotted to form consequent spaced ears 43—43. A pivot pin 44 is transversely mounted in said ears and constitutes a fulcrum for a clutch lever, which is designated as a whole by the reference numeral 45. This lever includes a normally horizontal arm 46 and a normally vertical arm 47. The arm 46 projects beyond the arm 39 of the bracket and carries a transverse bolt 48 by means of which the ends of a strap 49 are secured to the said horizontal arm 46, said strap being disposed on opposite sides of the drum 31 for engagement therewith, and also trained over the pin 41. The lower end of the vertical arm 47 is formed with a ring 50, which is formed with diametrically opposed openings 51—51. The interior diameter of this ring is considerably greater than the diameter of the shaft 16.

Loosely mounted upon the driven shaft 16 and disposed within the ring 50 in spaced relation thereto is a sleeve 52, which is formed with diametrically opposed pins 53—53 adapted for engagement with the openings 51 of said ring 50. It will thus be observed that upon forward movement of the sleeve 52, the clutch lever 45 will be rocked upon its fulcrum 44, and as a result, the forward end of the horizontal arm 46 of said lever will be raised, thereby causing the strap 49 to frictionally engage the periphery of the pulley 31, and as a result couple the driven shaft 16 to the crank shaft 15.

The rear end of the sleeve 52 is formed with a peripheral groove 54, and loosely mounted upon the driven shaft 16 in rear of said sleeve is a second sleeve 55 of greater diameter than the said sleeve 52. Projecting outwardly from the sleeve 55 are diametrically opposed pins 56—56 adapted for engagement within slots 57—57 of a ring 58, which is centrally formed on an actuating lever 59. The lower end 60 of this lever below the ring 58, is pivoted, as at 61, to a bracket 62 mounted upon the main frame. Formed in the forward face of the sleeve 55 at diametrically opposite points are angular recesses 63—63. These recesses are disposed beyond the periphery of the sleeve 52, and respectively receive the angular shank 64 of a shipper pin 65, each pin being formed at its forward end with a transverse head 66, the lower edge 67 thereof being concaved to fit within the groove 54 of said sleeve 52. It will also be observed in this connection that the said lower edge 67 of each pin is disposed below the shank 64. These pins are held against longitudinal movement by means of set screws 68 or other suitable fastening means. Connected to the upper end of the actuating lever 59 is one end of a reach rod 69, said rod extending rearwardly and connected to a suitable hand lever, not shown. Upon forward movement of the rod 69, the actuating lever 59 will be rocked upon its fulcrum 61 and by means of the mechanism above described, the sleeve 55 will be moved forwardly along the driven shaft 16, thereby sliding the sleeve 52 upwardly to actuate the clutch as above described. When, however, it is desired to release the clutch to disengage the driven shaft 16 from the crank shaft 15, the rod 69 is moved rearwardly, and as a result, a reverse operation of the various parts will occur.

What is claimed is:

1. In a mower, the combination with a drive shaft, of a driven shaft disposed in longitudinal alinement therewith, a pulley fixedly secured on the drive shaft, a bracket fixedly secured on the driven shaft, the ends of the bracket projecting beyond the periphery of the pulley, a pin carried by one end of the bracket and disposed longitudinally beyond the periphery of the pulley, a lever fulcrumed on the other end of the bracket, a clutch strap for the pulley engageable at its bight with a pin and having its ends connected to one end of the lever, and means to actuate said lever.

2. In a mower, the combination with a drive shaft, of a driven shaft disposed in longitudinal alinement therewith, a pulley fixedly secured on the drive shaft, a bracket fixedly secured on the driven shaft, the ends of the bracket projecting beyond the periphery of the pulley, a pin carried by one end of the bracket and disposed longitudinally beyond the periphery of the pulley, a lever fulcrumed on the other end of the bracket, a clutch strap for the pulley engageable at its bight with the pin and having its ends connected to one end of the lever, a sleeve loosely mounted on the driven shaft and having pivotal connection with the other end of said lever, and operating means connected with said sleeve to actuate said lever.

3. In a mower, the combination with a drive shaft, of a driven shaft disposed in longitudinal alinement therewith, a pulley fixedly secured on the drive shaft, a bracket fixedly secured on the driven shaft, the ends of the bracket projecting beyond the periphery of the pulley, a pin carried by one end of the bracket and disposed longitudinally beyond the periphery of the pulley, a lever fulcrumed on the other end of the bracket, a clutch strap for the pulley engageable at its bight with the pin and having its ends connected to one end of the lever, a sleeve loosely mounted on the driven shaft and having pivotal connection with the other end of said lever, a second sleeve loosely mounted on said driven shaft, means connecting said sleeves, a bracket, a lever pivoted on the bracket and having a pin and slot connection with the second mentioned sleeve, and means for actuating said lever to slide said sleeves along the driven shaft to actuate the first mentioned lever.

In testimony whereof I affix my signature, in the presence of two witnesses.

JAMES L. MORROW.

Witnesses:
SIDNEY E. DAVIS,
L. H. THOMAS.

Copies of this patent may be obtained for five cents each, by addressing the "Commissioner of Patents, Washington, D. C."